(12) United States Patent
Boisson et al.

(10) Patent No.: US 10,638,158 B2
(45) Date of Patent: Apr. 28, 2020

(54) METHOD FOR ENCODING AND METHOD FOR DECODING A LIGHT FIELD BASED IMAGE AND CORRESPONDING DEVICES

(71) Applicant: THOMSON Licensing, Issy-les-Moulineaux (FR)

(72) Inventors: Guillaume Boisson, Pleumeleuc (FR); Patrick Lopez, Livré sur Changeon (FR); Dominique Thoreau, Cesson Sévigné (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/769,896

(22) PCT Filed: Oct. 20, 2016

(86) PCT No.: PCT/EP2016/075185
§ 371 (c)(1),
(2) Date: Apr. 20, 2018

(87) PCT Pub. No.: WO2017/068022
PCT Pub. Date: Apr. 27, 2017

(65) Prior Publication Data
US 2018/0316935 A1    Nov. 1, 2018

(30) Foreign Application Priority Data
Oct. 21, 2015   (EP) .................................... 15306685

(51) Int. Cl.
*G06T 15/10*   (2011.01)
*H04N 19/597*   (2014.01)
(Continued)

(52) U.S. Cl.
CPC ......... *H04N 19/597* (2014.11); *H04N 19/176* (2014.11); *H04N 19/577* (2014.11);
(Continued)

(58) Field of Classification Search
CPC ..................................................... G06T 15/10
(Continued)

(56) References Cited

U.S. PATENT DOCUMENTS 8,581,929 B1 * 11/2013 Maguire, Jr. ........... G06F 3/013
345/619
2003/0063809 A1    4/2003 Andrew
(Continued)

FOREIGN PATENT DOCUMENTS

JP    2004052952    2/2004
JP    2009505607    2/2009
(Continued)

OTHER PUBLICATIONS

Magnor et al., "Data Compression for Light-Field Rendering", IEEE Transactions on Circuits and Systems for Video Technology, vol. 10, No. 3, Apr. 2000, pp. 338-343.
(Continued)

*Primary Examiner* — Anand S Rao
(74) *Attorney, Agent, or Firm* — Brian J. Dorini, Esquire; Robert D. Shedd, Esquire (57) ABSTRACT

A method for encoding a plenoptic image divided into blocks is disclosed. The method comprises: —encoding (S120) a block in a central region of the plenoptic image, called central block, without spatial prediction; and —predictively encoding (S130) blocks immediately surrounding said central block by spatially interleaving spatial unidirectional prediction and spatial bi-directional prediction.

18 Claims, 8 Drawing Sheets

(51) Int. Cl.
*H04N 19/176* (2014.01)
*H04N 19/593* (2014.01)
*H04N 19/577* (2014.01)
*H04N 19/167* (2014.01)
*H04N 19/11* (2014.01)

(52) U.S. Cl.
CPC ........... *H04N 19/593* (2014.11); *H04N 19/11* (2014.11); *H04N 19/167* (2014.11)

(58) Field of Classification Search
USPC ........................................ 375/240.11–240.29
See application file for complete search history.

(56) References Cited

U.S. PATENT DOCUMENTS

| | | |
|---|---|---|
| 2012/0140829 A1 | 6/2012 | Rane et al. |
| 2014/0071235 A1 | 3/2014 | Zhang et al. |
| 2014/0232822 A1 | 8/2014 | Venkataraman et al. |

FOREIGN PATENT DOCUMENTS

| | | |
|---|---|---|
| JP | 2014086968 | 5/2014 |
| WO | WO2007052969 | 5/2007 |
| WO | WO2008146190 | 12/2008 |

OTHER PUBLICATIONS

Zhang et al., "Compression of Lumigraph with Multiple Reference Frame (MRF) Prediction and Just-in-time Rendering", Data Compression Conference, Snowbird, Utah, USA, Mar. 28, 2000, pp. 253-262.
Li et al., "Efficient Intra Prediction Scheme for Light Field Image Compression", 2014 IEEE International Conference on Acoustics, Speech and Signal Processing (ICASSP), Florence, Italy, May 4, 2014, pp. 539-543.
Shi et al., "Efficient Compression Method for Integral Images Using Multi-View Video Coding", 2011 18th International Conference on Image Processing (ICIP), Brussels, Belgium, Sep. 11, 2011, pp. 137-140.
Conti et al., "Spatial Prediction Based on Self-Similarity Compensation for 3D Holoscopic Image and Video Coding", 2011 18th International Conference on Image Processing (ICIP), Brussels, Belgium, Sep. 11, 2011, pp. 961-964.
Forman et al., "A Novel Coding Scheme for Full Parallax 3D-TV Pictures", 1997 IEEE International Conference on Acoustics, Speech and Signal Processing, (ICASSP'97), Munich, Germany, Apr. 21, 1997, pp. 2945-2947.
Anonymous, "Vignetting", Wikipedia, the free encyclopedia, https://en.wikipedia.org/wiki/Vignetting, Jan. 26, 2016, pp. 1-4.
NG et al., "Light Field Photography with a Hand-held Plenoptic Camera", Stanford University, Stanford Tech Report CTSR 2005-02, Apr. 2005, pp. 1-11.
Sabater et al., "Light-Field Demultiplexing and Disparity Estimation", 6th International Conference on Complementary Problems (ICCP 2014), Berlin, Germany, Aug. 4, 2014, pp. 1-9.
Magnor et al., "Hierarchical Coding of Light Fields with Disparity Maps", 1999 International Conference on Image Processing, Kobe, Japan, Oct. 24, 1999, pp. 334-338.
Venkataraman et al., "PiCam: An Ultra-Thin High Performance Monolithic Camera Array", ACM Transactions on Graphics, vol. 32, No. 6, Article 166, Nov. 2013, pp. 1-13.

\* cited by examiner

Matrix of 18x18 views

METHOD FOR ENCODING AND METHOD FOR DECODING A LIGHT FIELD BASED IMAGE AND CORRESPONDING DEVICES

This application claims the benefit, under 35 U.S.C. § 365 of International Application PCT/EP2016/075185, filed Oct. 20, 2016, which was published in accordance with PCT Article 21(2) on Apr. 27, 2017, in English, and which claims the benefit of European Patent Application No. 15306685.7, filed Oct. 21, 2015.

1. TECHNICAL FIELD

The present disclosure relates to light field imaging, and to technologies for acquiring and processing light field data. More precisely, a method and a device for encoding and a method and a device for decoding a light field based image, namely a plenoptic image, are disclosed.

2. BACKGROUND ART

Plenoptic cameras are gaining a lot of popularity in the field of computational photography because of the additional information they capture compared to traditional cameras. Indeed, they are able to measure the amount of light traveling along each ray bundle that intersects the sensor, thanks to a microlens array placed between a main lens and a sensor. As a result, such cameras have novel post-capture processing capabilities. For example, after the image acquisition, the point of view, the focus or the depth of field may be modified.

Figure 1:
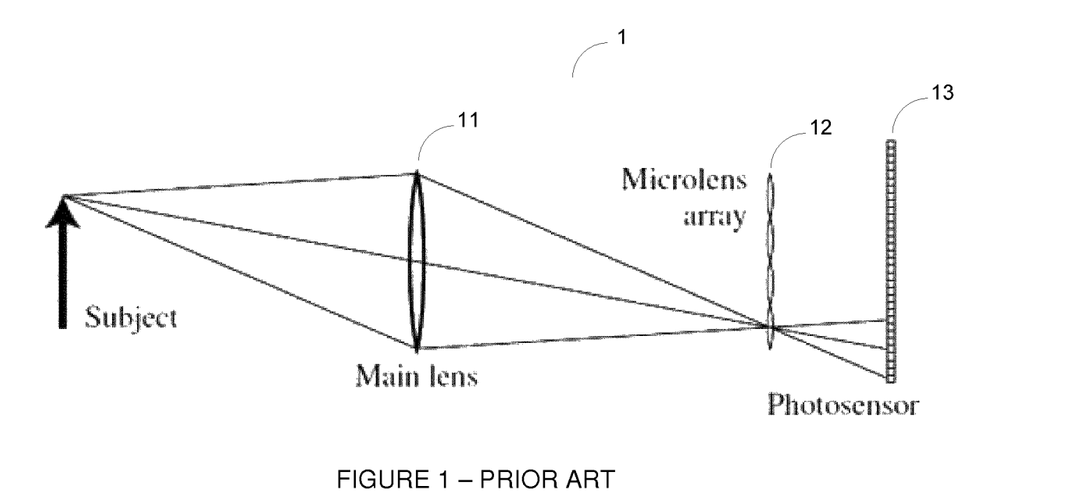
FIG. 1 depicts a schematic view of a plenoptic camera.

A schematic view of a plenoptic camera is represented on FIG. 1. The plenoptic camera 1 is formed of a lens arrangement associated with a photosensor array 13, also called imaging sensor. The lens arrangement comprises a main lens 11 and a microlens array 12, which comprises a plurality of microlenses (e.g. an array of L×L microlenses). A microimage is an n×n image formed on the photosensor 13 array behind a microlens. The collection of micro-images forms a 4D raw light field image more simply called a raw image or a raw plenoptic image. From the raw image, a matrix of views (also called a set of sub-aperture images) may be obtained by demosaicing and demultiplexing. The demosaicing enables to recover a full color raw image, i.e. to recover full color information (for example RGB information, RGB standing for "Red", "Green" and "Blue") for the pixels of the raw image. The demultiplexing performed after the demosaicing enables to recover the different views. Demultiplexing comprises grouping co-located pixels from every micro-image after demosaicing. A view is also called a sub-aperture image. Some cameras such as the Pelican Imaging® camera, directly deliver matrices of views (i.e. does not require de-mozaicing). Moreover, the term 4D light field image (also noted plenoptic image) corresponds to either a 4D raw light field image or a matrix of views (see for example the Chapter 3.3 of the Phd dissertation thesis entitled "Digital Light Field Photography" by Ren Ng, published in July 2006).

Figure 2:
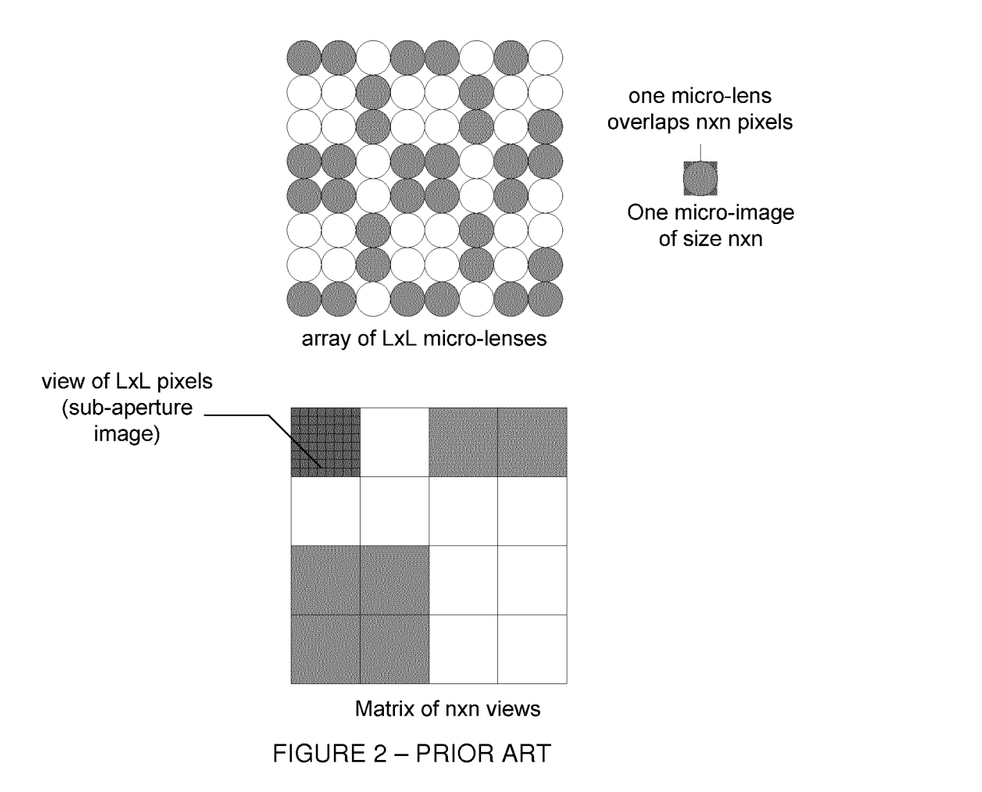
FIG. 2 depicts an array of micro-lenses and a matrix of views.

As depicted on FIG. 2, in the case where the microlens array is an array of L×L micro-lenses and each micro-image is of size n×n, then the matrix of views obtained after demosaicing and de-multiplexing is of size n×n with each sub-aperture image/view being of size L×L.

Encoding such content (i.e. the raw image or the matrix of views) with known video codecs (e.g. H.264, HEVC, etc) is not optimal because these codecs do not take into account the specificities of plenoptic imaging.

3. BRIEF SUMMARY

A method for encoding a plenoptic image divided into blocks is disclosed. The method comprises:
 encoding a block in a central region of the plenoptic image, called central block, without spatial prediction; and
 predictively encoding blocks immediately surrounding said central block by spatially interleaving spatial unidirectional prediction and spatial bi-directional prediction.

In a variant, it is proposed a method for encoding a 4D light field image divided into blocks comprising:
 encoding a block in a geometrically central region of the 4D light field image compared to other blocks of the 4D light field image, called central block, without spatial prediction with a reference block in said 4D light field image;
 predictively encoding blocks immediately surrounding said central block by spatially interleaving spatial unidirectional prediction and spatial bi-directional prediction with one or several reference blocks, in said 4D light field image, being either the central block itself or a block in said 4D light field image that has been encoded with the central block as a reference block.

The present embodiments also provide a device for encoding a plenoptic image divided into blocks. The device for encoding comprises:
 means for encoding a block in a central region of the plenoptic image, called central block, without spatial prediction; and
 means for predictively encoding blocks immediately surrounding said central block by spatially interleaving spatial unidirectional prediction and spatial bi-directional prediction.

The present embodiments also provide an encoding device that comprises a communication interface configured to access a plenoptic image divided into blocks and at least one processor configured to:
 encode a block in a central region of the accessed plenoptic image, called central block, without spatial prediction; and
 predictively encode blocks immediately surrounding said central block by spatially interleaving spatial unidirectional prediction and spatial bi-directional prediction.

The present embodiments also provide a computer program product comprising program code instructions to execute the following steps when this program is executed on a computer:
 encoding a block in a central region of the plenoptic image, called central block, without spatial prediction; and
 predictively encoding blocks immediately surrounding said central block by spatially interleaving spatial unidirectional prediction and spatial bi-directional prediction.

The present embodiments also provide a non-transitory computer readable medium with instructions stored therein which, upon execution, instruct at least one processor to:
 encode a block in a central region of the plenoptic image, called central block, without spatial prediction; and
 predictively encode blocks immediately surrounding said central block by spatially interleaving spatial unidirectional prediction and spatial bi-directional prediction.

In the case of an odd number of blocks, predictively encoding immediately surrounding blocks by spatially interleaving spatial unidirectional prediction and spatial bi-directional prediction may comprise encoding the immediately surrounding blocks neighboring vertically or horizontally the central block by spatial unidirectional prediction and encoding the other surrounding blocks by spatial bi-directional prediction.

In the case of an even number of blocks, predictively encoding immediately surrounding blocks by spatially interleaving spatial unidirectional prediction and spatial bi-directional prediction may comprise encoding one immediately surrounding block neighboring vertically the central block and one immediately surrounding block neighboring horizontally the central block spatial by unidirectional prediction; encoding the immediately surrounding block neighboring the two immediately surrounding blocks previously encoded by bi-directional prediction; encoding, by unidirectional prediction, the immediately surrounding blocks neighboring vertically or horizontally one of the previously encoded blocks and encoding the remaining immediately surrounding block by bi-directional prediction.

In another embodiment, remaining blocks are predictively encoded from the center of the plenoptic image up to the borders of the plenoptic image by spatially interleaving spatial unidirectional and spatial bi-directional predictions.

According to a specific characteristic, the blocks are one of a micro-image or a view.

Advantageously, the central is intra coded without spatial prediction. In a variant, the central block is temporally predicted from a spatially co-located block in a reconstructed plenoptic image.

In a specific embodiment, the blocks are views and during prediction of a block by a reference block, the reference block is weighted by a weight derived from vignetting information.

A method for decoding a plenoptic image divided into blocks is disclosed. The decoding method comprises:
  decoding a block in a central region of the plenoptic image, called central block, without spatial prediction; and
  predictively decoding immediately surrounding blocks by spatially interleaving spatial unidirectional prediction and spatial bi-directional prediction.

In a variant, it is also proposed a method for decoding a 4D light field image divided into blocks comprising:
  decoding a block in a geometrically central region of the 4D light field image compared to other blocks of the 4D light field image, called central block, without spatial prediction with a reference block in the 4D light field image;
  predictively decoding blocks immediately surrounding said central block by spatially interleaving spatial unidirectional prediction and spatial bi-directional prediction with one or several reference blocks, in said 4D light field image, being either the central block itself or a block in said 4D light field image that has been encoded with the central block as a reference block.

The present embodiments also provide a device for decoding a plenoptic image divided into blocks. The device for decoding comprises:
  means for decoding a block in a central region of the plenoptic image, called central block, without spatial prediction; and
  means for predictively decoding immediately surrounding blocks by spatially interleaving spatial unidirectional prediction and spatial bi-directional prediction.

The present embodiments also provide a decoding device that comprises a communication interface configured to access a bitstream and at least one processor configured to:
  decode a block in a central region of the plenoptic image, called central block, without spatial prediction from said accessed bitstream; and
  predictively decode immediately surrounding blocks by spatially interleaving spatial unidirectional prediction and spatial bi-directional prediction from said accessed bitstream.

The present embodiments also provide a computer program product comprising program code instructions to execute the following steps when this program is executed on a computer:
  decoding a block in a central region of the plenoptic image, called central block, without spatial prediction; and
  predictively decoding immediately surrounding blocks by spatially interleaving spatial unidirectional prediction and spatial bi-directional prediction.

The present embodiments also provide a non-transitory computer readable medium with instructions stored therein which, upon execution, instruct at least one processor to:
  decode a block in a central region of the plenoptic image, called central block, without spatial prediction from said accessed bitstream; and
  predictively decode immediately surrounding blocks by spatially interleaving spatial unidirectional prediction and spatial bi-directional prediction from said accessed bitstream.

In the case of an odd number of blocks, predictively decoding immediately surrounding blocks by spatially interleaving spatial unidirectional prediction and spatial bi-directional prediction may comprise decoding the immediately surrounding blocks neighboring vertically or horizontally the central block by spatial unidirectional prediction and decoding the other surrounding blocks by spatial bi-directional prediction.

In the case of an even number of blocks, predictively decoding immediately surrounding blocks by spatially interleaving spatial unidirectional prediction and spatial bi-directional prediction may comprise decoding one immediately surrounding block neighboring vertically the central block and one immediately surrounding block neighboring horizontally the central block spatial by unidirectional prediction; decoding the immediately surrounding block neighboring the two immediately surrounding blocks previously decoded by bi-directional prediction; decoding, by unidirectional prediction, the immediately surrounding blocks neighboring vertically or horizontally one of the previously decoded blocks and decoding the remaining immediately surrounding block by bi-directional prediction.

In an exemplary embodiment, remaining blocks are predictively decoded from the center of the plenoptic image up to the borders of the plenoptic image by interleaving spatial unidirectional and spatial bi-directional predictions According to a specific characteristic, the blocks are one of a micro-image or a view.

Advantageously, the central block is intra coded without spatial prediction. In a variant, the central block is temporally predicted from a spatially co-located block in a reconstructed plenoptic image.

In a specific embodiment, the blocks are views and during prediction of a block by a reference block, the reference block is weighted by a weight derived from vignetting information.

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices.

Figure 3:
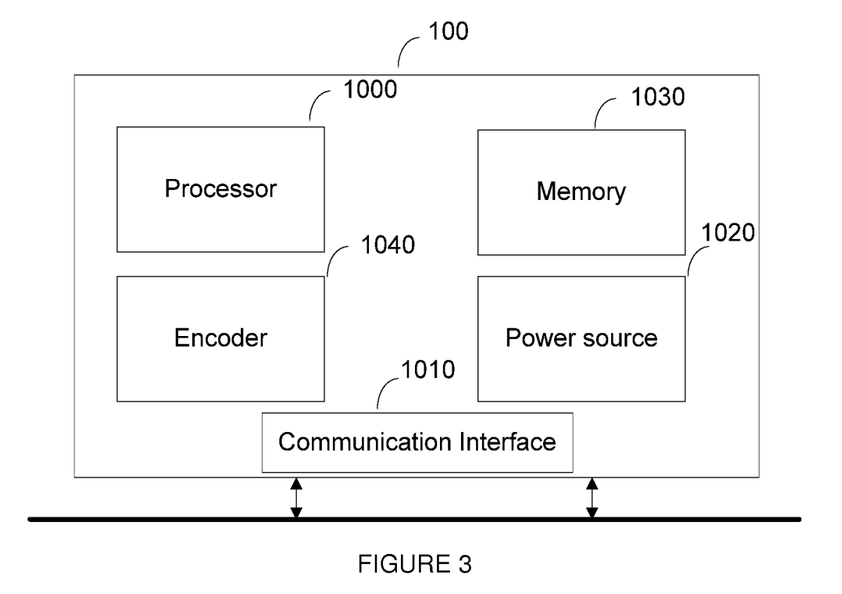
FIG. 3 represents an exemplary architecture of a transmitter configured to encode a plenoptic image in a stream according to an exemplary and non-limiting embodiment.

FIG. 3 represents an exemplary architecture of a transmitter 100 configured to encode a plenoptic image in a stream according to an exemplary and non-limiting embodiment.

The transmitter 100 comprises one or more processor(s) 1000, which could comprise, for example, a CPU, a GPU and/or a DSP (English acronym of Digital Signal Processor), along with internal memory 1030 (e.g. RAM, ROM, and/or EPROM). The transmitter 100 comprises one or more communication interface(s) 1010, each adapted to display output information and/or allow a user to enter commands and/or data (e.g. a keyboard, a mouse, a touchpad, a webcam); and a power source 1020 which may be external to the transmitter 100. The transmitter 100 may also comprise one or more network interface(s) (not shown). Encoder module 1040 represents a module that may be included in a device to perform the coding functions. Additionally, encoder module 1040 may be implemented as a separate element of the transmitter 100 or may be incorporated within processor(s) 1000 as a combination of hardware and software as known to those skilled in the art.

The plenoptic image may be obtained from a source. According to different embodiments, the source can be, but is not limited to:

a local memory, e.g. a video memory, a RAM, a flash memory, a hard disk;
a storage interface, e.g. an interface with a mass storage, a ROM, an optical disc or a magnetic support;
a communication interface, e.g. a wireline interface (for example a bus interface, a wide area network interface, a local area network interface) or a wireless interface (such as a IEEE 802.11 interface or a Bluetooth interface); and
an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 100 further comprises a computer program stored in the memory 1030. The computer program comprises instructions which, when executed by the transmitter 100, in particular by the processor 1000, enable the transmitter 100 to execute the method described with reference to FIG. 4. According to a variant, the computer program is stored externally to the transmitter 100 on a non-transitory digital data support, e.g. on an external storage medium such as a HDD, CD-ROM, DVD, a read-only and/or DVD drive and/or a DVD Read/Write drive, all known in the art. The transmitter 100 thus comprises a mechanism to read the computer program. Further, the transmitter 100 could access one or more Universal Serial Bus (USB)-type storage devices (e.g., "memory sticks.") through corresponding USB ports (not shown).

According to exemplary and non-limiting embodiments, the transmitter 100 can be, but is not limited to:

a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

Figure 4:
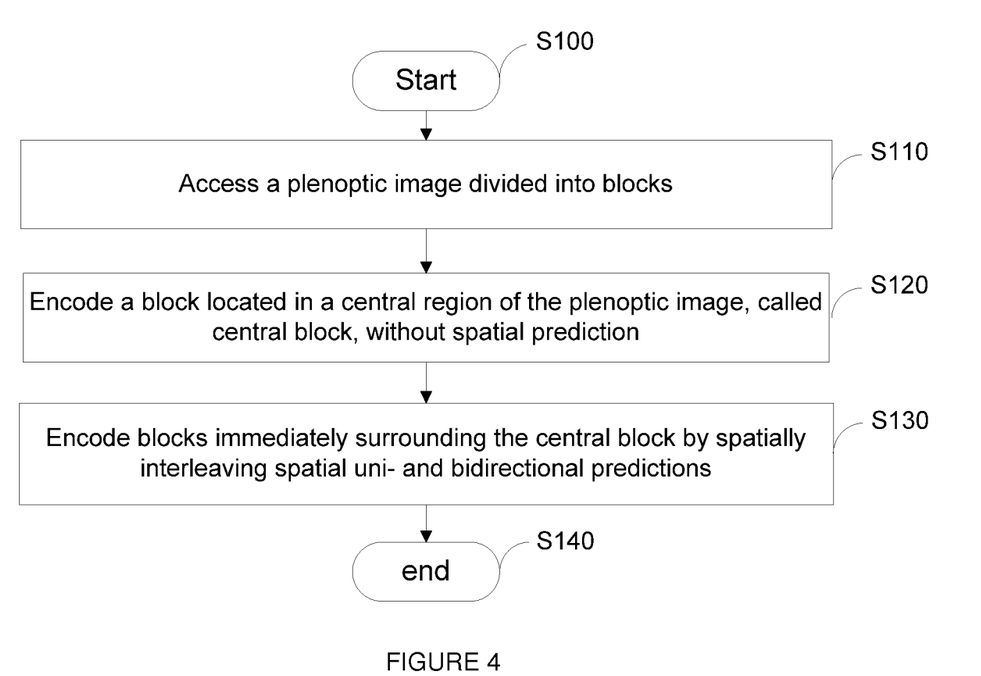
FIG. 4 represents a flowchart of a method for encoding a plenoptic image in a stream according to a specific and non-limiting embodiment.

FIG. 4 represents a flowchart of a method for encoding a plenoptic image in a stream according to a specific and non-limiting embodiment.

Figure 5:
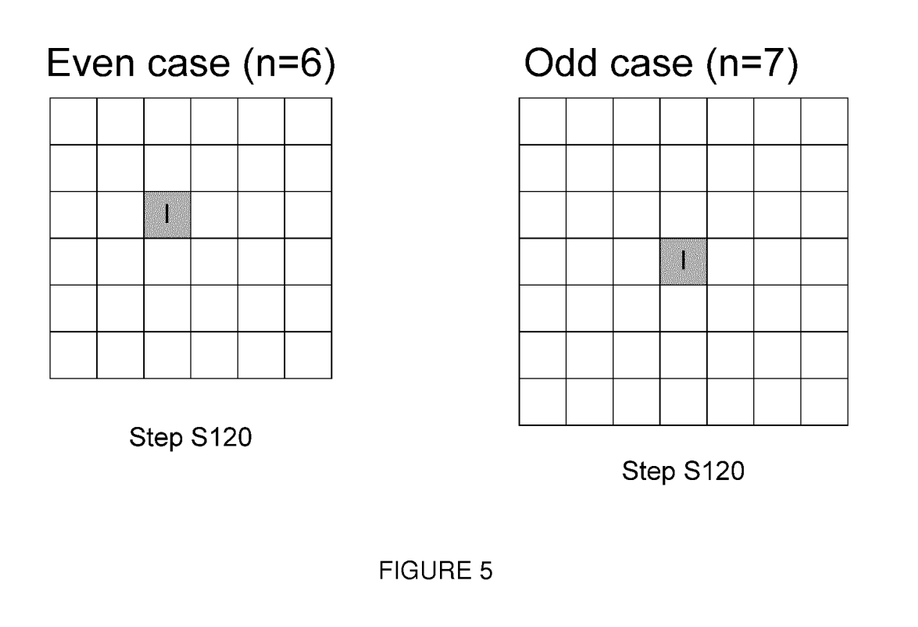
FIG. 5 shows a central block in the case of an even number n of blocks (left side) and in the case of an odd number n of blocks (right side)

The method starts at step S100. A step S110, a transmitter accesses a current plenoptic image divided into blocks. In a first embodiment a block is a view. In a variant, a block is a micro-image. Block size may be either read from metadata, or determined from the content. Block size may also be transmitted in the stream, if not deducible from another information available at decoder side (e.g. camera device model). At step S120, the transmitter encodes a central block of the current plenoptic image without spatial prediction, i.e. without reference to another block in the same image. A central block is a block located in a central region of the current plenoptic image. As an example, the central block is located at the center of the current plenoptic image to be encoded. As an example, the central block may be encoded in intra mode without spatial prediction. The central block is thus coded using information contained only in this block. As an example, the central block is coded in IPCM mode (IPCM stands for Intra Pulse Code Modulation), the pixel values of the block are coded directly without prediction, transformation or quantization which are bypassed. The central block is thus coded without any loss of fidelity. In a variant, the central block is coded with prediction from a constant block, e.g. for example from a block whose pixels are all equal to 128. Residues are thus obtained by subtracting the constant block from the central block. The residues are then transformed, quantized and entropy coded. In another variant, the central block is temporally predicted from a spatially co-located block in a reconstructed plenoptic image, i.e. a plenoptic image already coded and reconstructed for prediction and stored in a DPB (DPB stands for Decoded Picture Buffer). The spatially co-located block is thus a block whose spatial position in the reconstructed plenoptic image is the same as the spatial position of the central block in the current plenoptic image. Residues are thus obtained by subtracting the co-located block from the central block. Considering a square plenoptic image divided into n×n blocks, the central block may be the block of coordinates $$\left\lfloor \frac{n-1}{2} \right\rfloor, \left\lfloor \frac{n-1}{2} \right\rfloor$$

where $\lfloor . \rfloor$ denotes the integer part. FIG. 5 shows a central block in the case where n is even (n=6) on the left side and in the case where n is odd (n=7) on the right side.

Figure 6A:
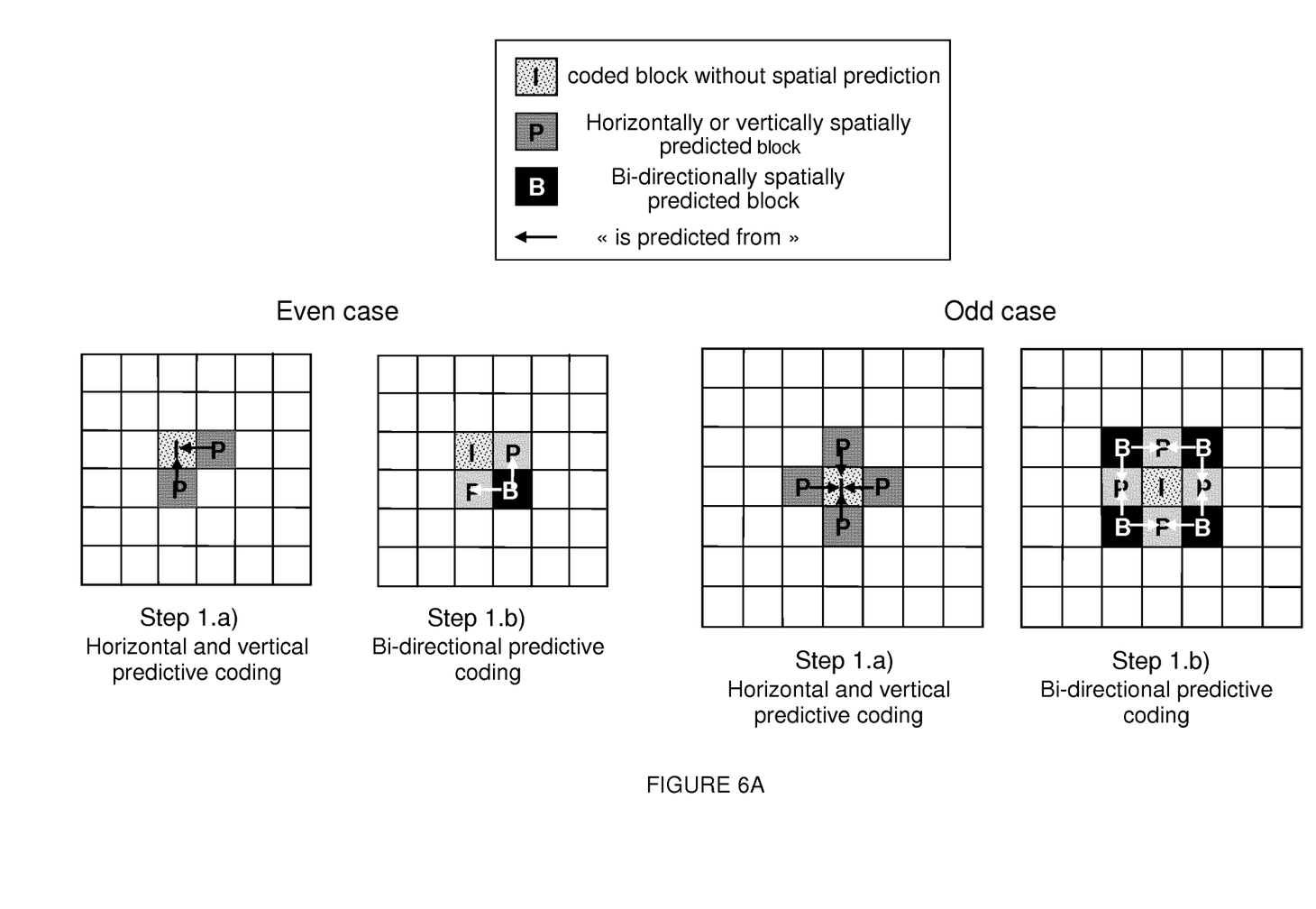
FIG. 6A to 6C show the spatial interleaving of unidirectional and bi-directional predictions in the case where n is even (left side) and in the case where n odd (right side)
Figure 6B:
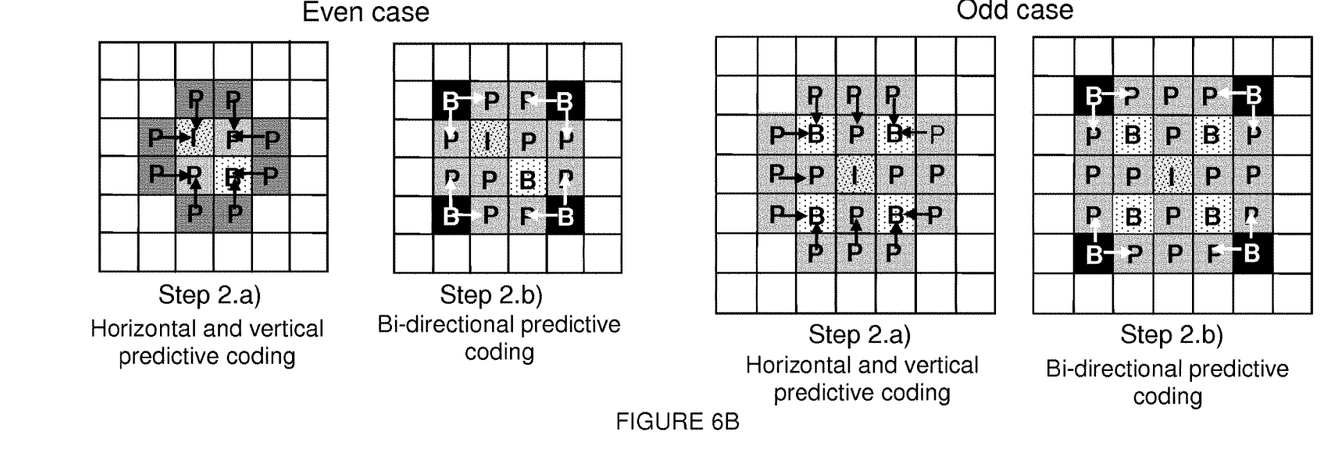
Figure 6C:
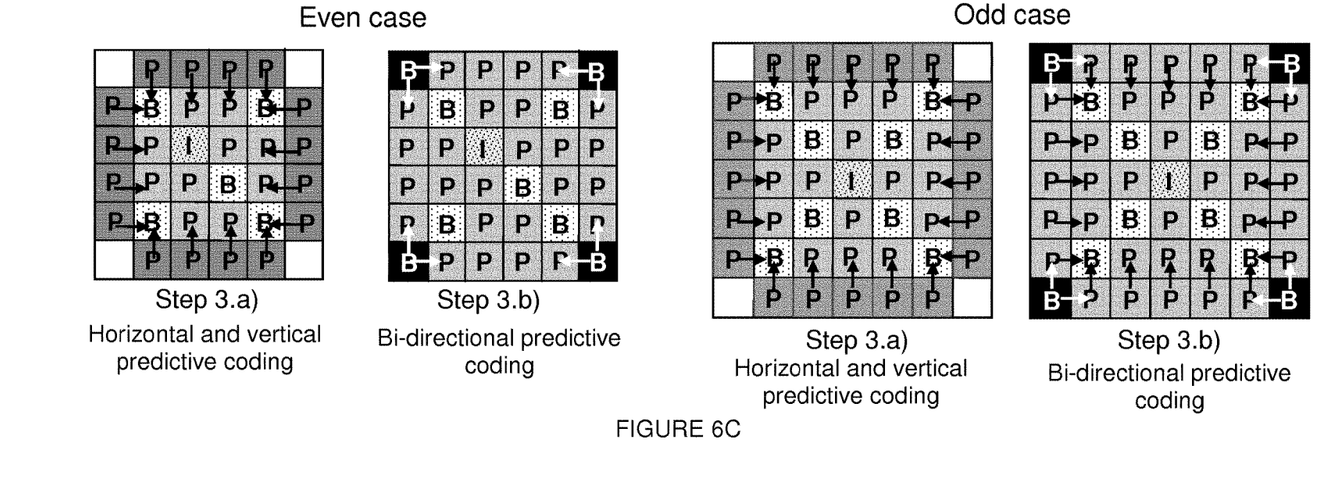

At step S130, the transmitter predictively encodes the remaining blocks from the center of the current plenoptic image up to the borders of the current plenoptic image by spatially interleaving spatial unidirectional and spatial bi-directional predictions. In another embodiment, the transmitter predictively encodes the blocks immediately surrounding the central block by spatially interleaving spatial unidirectional prediction and spatial bi-directional prediction. Unidirectional prediction (specifically horizontal and vertical predictions) and bi-directional prediction sub-steps are interleaved in order to propagate information from the center to the borders of the array/matrix. FIGS. 6A to 6C show the spatial interleaving of unidirectional and bi-directional predictions in the case where n is even (left side) and in the case where n is odd (right side). The method ends at S140.

Figure 7:
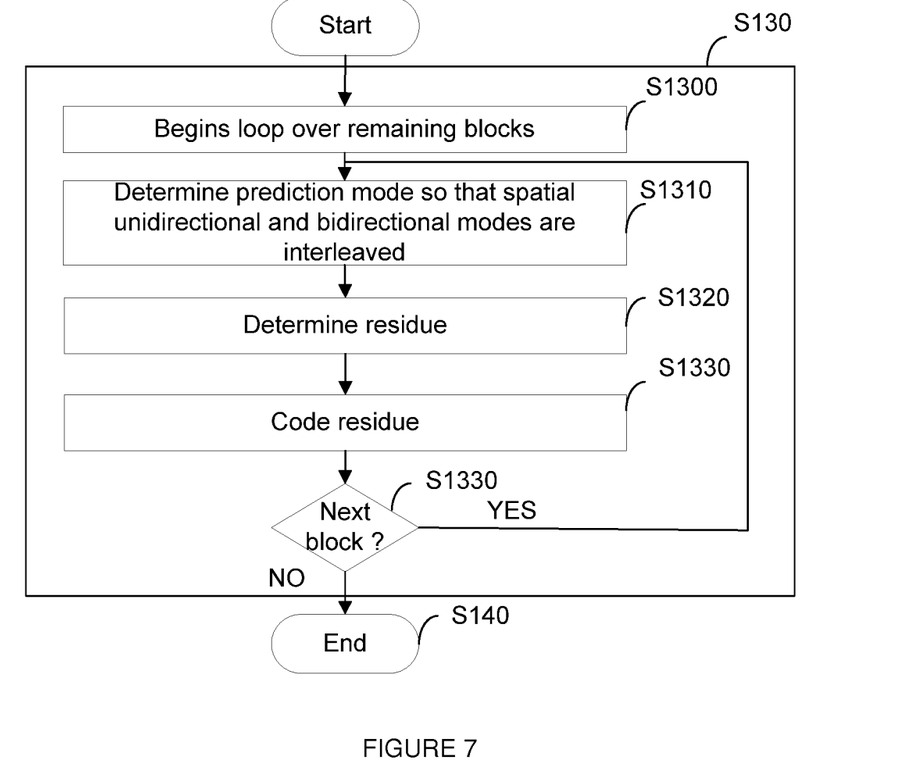
FIG. 7 represents a detail of FIG. 4.

Step S130 is detailed on FIG. 7. At step S1300, the methods begins to loop over the remaining blocks, i.e. the blocks different from the central block already coded at step S120. The remaining blocks are for example stored in a memory of the transmitter. At step S1310, a prediction mode between unidirectional and bidirectional is determined for the block to be coded. The prediction mode is determined so that spatial unidirectional and spatial bi-directional predictions are interleaved. Prediction modes and coding order are either known at decoder side as default parameters, e.g. defined by a standard, or are explicitly transmitted in the stream, e.g. encoded in the stream.

Let's denote $P_k$ and $B_k$ respectively the sets of blocks to be encoded during first and second sub-steps of step k, and $S_k = \{I_0\} \cup \{\cup_{l \leq k}(P_l \cup B_l)\}$ the set of all blocks encoded up to step k. $P_0$ and $B_0$ are empty sets.

The blocks to be encoded during a step k, k≥1, are the following:

The following blocks $P_k$ for which an horizontal or a vertical neighbor has just been encoded/reconstructed during step (k-1) are encoded in a first sub-step (sub-sets 1a, 2a or 3a on FIGS. 6A to 6C) using unidirectional prediction (i.e. horizontal and vertical prediction):

$$P_k = \left\{ \begin{array}{c} C[i, j] \notin S_{k-1}: \\ \exists\, C[y, x] \in S_{k-1}, ((y = i \pm 1) \text{ and } (x = j)) \text{ or} \\ ((y = i) \text{ and } (x = j \pm 1)) \end{array} \right\} \quad (1)$$

The following blocks $B_k$ located at the corners of the rectangle started at previous sub-step are encoded in a second sub-step ((sub-sets 1b, 2b or 3b on FIGS. 6A to 6C) using bi-directional prediction:

$$B_k = \left\{ \begin{array}{c} C[i, j] \notin S_{k-1}: \\ \exists\, C[y, x] \in P_k, (y = i \pm 1) \text{ and } (x = j \pm 1) \end{array} \right\} \quad (2)$$

Note that the definition of $P_1$ is different depending on the parity of n. If n is odd, the definition of $P_1$ complies with the generic one:

$$P_1^{odd} = \left\{ \begin{array}{c} C[i, j] \notin S_0: \\ \exists\, C[y, x] \in S_0, ((y = i \pm 1) \text{ and } (x = j)) \text{ or} \\ ((y = i) \text{ and } (x = j \pm 1)) \end{array} \right\} \quad (1a)$$

If n is even, the definition of $P_1$ only involves plus signs:

$$P_1^{even} = \left\{ \begin{array}{c} C[i, j] \notin S_0: \\ \exists\, C[y, x] \in S_0, ((y = i + 1) \text{ and } (x = j)) \text{ or} \\ ((y = i) \text{ and } (x = j + 1)) \end{array} \right\}$$

Once the prediction mode is determined for the bock to be coded, residues are determined at step S1320. Blocks $C[i, j] \in P_k$, k≥1, are predicted from block(s) $C[y, x] \in S_{k-1}$ that verifies:

$$\left\{ \begin{array}{l} (y = i) \text{ and } (x = j \pm 1) \text{ or} \\ ((y = i \pm 1) \text{ and } (x = j)) \end{array} \right.$$

Blocks $C[i,j] \in B_k$, k≥1, are predicted from block(s) $C[y, x] \in P_k$ that verify:

$$(y = i \pm 1) \text{ and } (x = j \pm 1)$$

Residues ε are determined by subtracting a reference block R (pixel by pixel) from the block C to be encoded to form a residual block ε[i,j]. ε[i,j]=C[i,j]−R[i,j]. In case of bi-directional prediction R[i, j] may be an average of 2 blocks. At step S1330, the residual block also called block of residues is encoded. Encoding the residual block usually comprises transforming (e.g. using a DCT) the residual block into coefficients, quantizing the coefficients and entropy coding the quantized coefficients. It will be appreciated, however, that the present principles are not restricted to this specific encoding method. At step S1340, the transmitter checks whether more remaining blocks exists. If yes, the control returns to step S1310. Otherwise, the method ends at S140.

In a variant of step S1320, the disparity between neighboring blocks (i.e. between neighboring micro-image or neighboring views) is taken into account when determining the residues. The disparity has only one component: shifts between horizontal neighbors are horizontal only and shifts between vertical neighbors are vertical only. There is a direct relationship between depth and disparity. Specifically, disp= (b*f)/depth, where b is the distance between two viewpoints and f is the focal length. Therefore, disparity may be derived from depth estimations using other metadata delivered along with plenoptic material (focal length and micro-centers position for micro-images, or with virtual inter-axial distances for a matrix of views). Depth estimations may be determined from a depth map delivered along with plenoptic material (one value per pixel or per block, depending on depth resolution). In a variant, depth may be inferred (e.g. one value for the whole image, by reading metadata encoding the focus distance).

In another embodiment, disparities may be determined (one value per pixel or preferably one value per block) directly from the content, in which case, values have to be transmitted along with the stream.

In order to compensate for the disparity between neighboring blocks, the residual block is determined as follows:

$$\epsilon[i,j]=C[i,j]-W_{R\to C}(R)[i,j]$$

where $W_{\to C}(.)$ denotes a warping operator corresponding to disparity compensation for the current block and $W_{R\to C}(R)$ is thus the reference block compensated in disparity. For instance, in the case where the disparity is constant across the block, then $W_{R\to C}(R)[i,j]=R[i+di, j+dj]$, else $W_{R\to C}(R)$ is determined as follows: $W_{R\to C}(R)[i,j]=R[i+d_x[i,j],j+d_y[i,j]]$.

Figure 8:
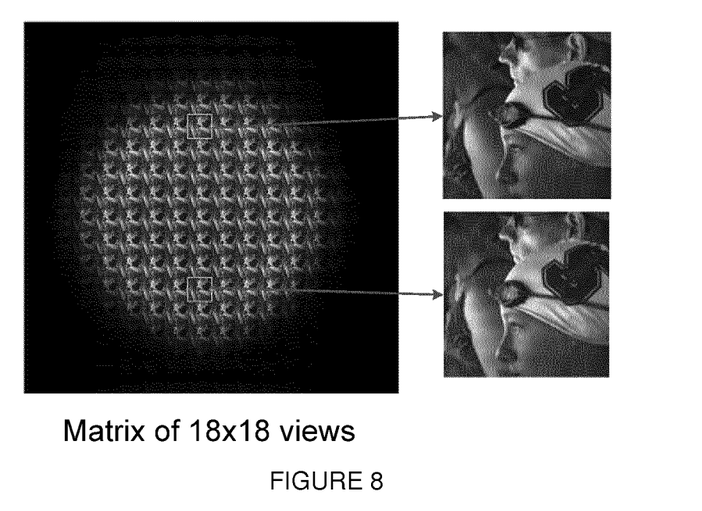
FIG. 8 depicts a matrix of views on the left and illustrates the vignetting effect on the right side.

In another variant of step S1320, illustrates the vignetting effect is further taken into account when determining the residues. FIG. 8 depicts a matrix of views on the left and illustrates the vignetting effect which makes the surrounding outside views darker than center views. In order to compensate the vignetting effect, prediction is adapted.

If views are small enough, it is reasonable to consider one value only (a gain on luminance) for each couple of views. These gains derive from vignetting metadata delivered along the stream:

$$\epsilon[i, j] = C[i, j] - \frac{\alpha_c}{\alpha_R} \times W_{R\to C}(R)[i, j] \quad (1)$$

where ε denotes the residue, C the current block to be encoded, $W_{R\to C}(R)$ is the reference block compensated in disparity, and $\alpha_C$ and $\alpha_R$ respectively the vignetting gain of the blocks C and R. In a variant, $\epsilon[i,j]=C[i,j]-\alpha_C/\alpha_R\times R$ when there is no disparity.

In the bidirectional case, the Equation (1) becomes:

$$\epsilon[i, j] = C[i, j] - \frac{\alpha_c}{2} \times \left( \frac{W_{R_1\to C}(R_1)[i, j]}{\alpha_{R_1}} + \frac{W_{R_2\to C}(R_2)[i, j]}{\alpha_{R_2}} \right) \quad (2)$$

For larger views, a per pixel approach is to be considered. Equations (1) and (2) become:

$$\epsilon[i, j] = C[i, j] - \frac{\alpha_c[i, j]}{\alpha_R[i, j]} \times W_{R\to C}(R)[i, j] \quad (3)$$

$$[i, j] = C[i, j] - \frac{\alpha_c[i, j]}{2} \times \left( \frac{W_{R_1\to C}(R_1)[i, j]}{\alpha_{W_{R_1\to C}(R_1)}[i, j]} + \frac{W_{R_2\to C}(R_2)[i, j]}{\alpha_{W_{R_2\to C}(R_2)}[i, j]} \right) \quad (4)$$

In an embodiment, luminance gains α are fetched in calibrated white images provided along the video sequence. In another embodiment, they derive from calibration metadata following the $\cos^4$ law of illumination falloff.

$$\alpha_{u,v} = \cos^4\left(\mathrm{atan}\left(\frac{\sqrt{(u-c_u)^2+(v-c_v)^2}}{f}\right)\right) \quad (5)$$

where (u, v) denote pixel coordinates in the whole matrix of views, ($c_u$, $c_v$) the coordinates of the principal point, and f the focal length in pixels.

On FIGS. 4 and 7, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 9:
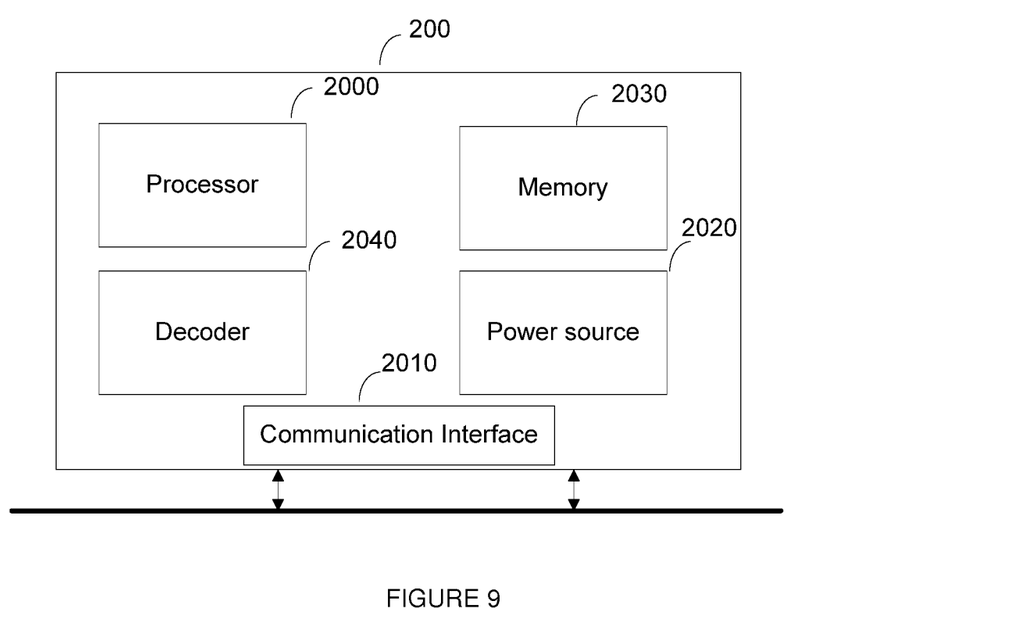
FIG. 9 represents an exemplary architecture of a receiver configured to decode a plenoptic image from a stream according to an exemplary and non-limiting embodiment.

FIG. 9 represents an exemplary architecture of a receiver 200 configured to decode a plenoptic image from a stream according to an exemplary and non-limiting embodiment.

The receiver 200 comprises one or more processor(s) 2000, which could comprise, for example, a CPU, a GPU and/or a DSP (English acronym of Digital Signal Processor), along with internal memory 2030 (e.g. RAM, ROM and/or EPROM). The receiver 200 comprises one or more communication interface(s) 2010, each adapted to display output information and/or allow a user to enter commands and/or data (e.g. a keyboard, a mouse, a touchpad, a webcam); and a power source 2020 which may be external to the receiver 200. The receiver 200 may also comprise one or more network interface(s) (not shown). Decoder module 2040 represents a module that may be included in a device to perform the decoding functions. Additionally, decoder module 2040 may be implemented as a separate element of the receiver 200 or may be incorporated within processor(s) 2000 as a combination of hardware and software as known to those skilled in the art. The stream may be obtained from a source. According to different embodiments, the source can be, but not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded plenoptic image may be sent to a destination, e.g. a display device. As an example, the decoded plenoptic image is stored in a remote or in a local memory, e.g. a video memory or a RAM, a hard disk. In a variant, the decoded plenoptic image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the receiver 200 further comprises a computer program stored in the memory 2030. The computer program comprises instructions which, when executed by the receiver 200, in particular by the processor 2000, enable the receiver to execute the method described with reference to FIG. 10. According to a variant, the computer program is stored externally to the receiver 200 on a non-transitory digital data support, e.g. on an external storage medium such as a HDD, CD-ROM, DVD, a read-only and/or DVD drive and/or a DVD Read/Write drive, all known in the art. The receiver 200 thus comprises a mechanism to read the computer program. Further, the receiver 200 could access one or more Universal Serial Bus (USB)-type storage devices (e.g., "memory sticks.") through corresponding USB ports (not shown).

According to exemplary and non-limiting embodiments, the receiver 200 can be, but not limited to:
 a mobile device;
 a communication device;
 a game device;
 a set top box;
 a TV set;
 a tablet (or tablet computer);
 a laptop;
 a display and
 a decoding chip.

Figure 10:
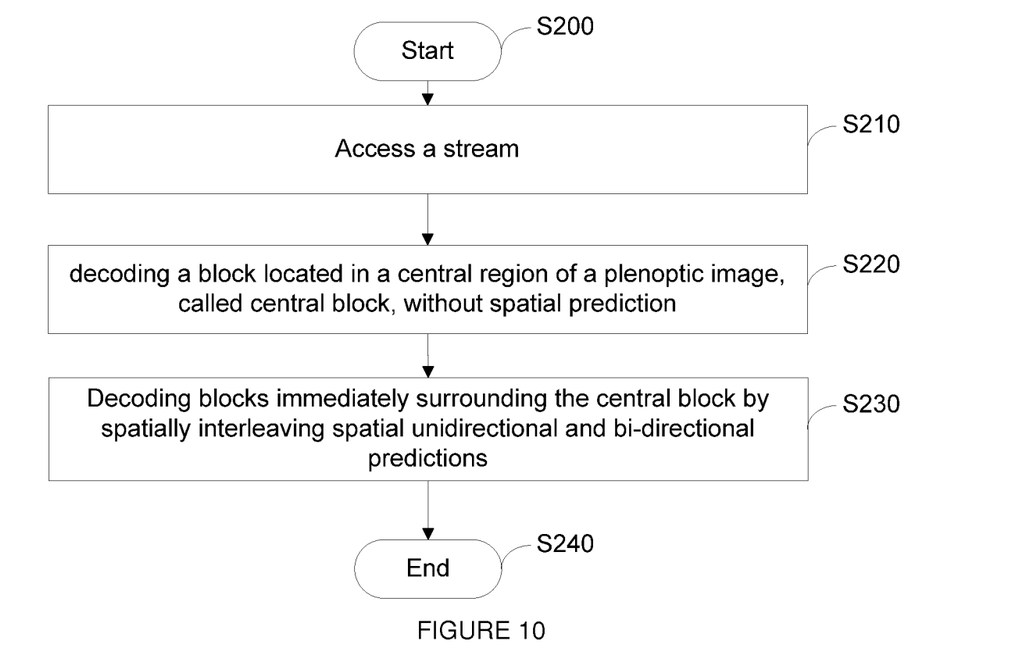
FIG. 10 represents a flowchart of a method for decoding a plenoptic image from a stream F according to an exemplary and non-limiting embodiment.

FIG. 10 represents a flowchart of a method for decoding a plenoptic image from a stream F according to an exemplary and non-limiting embodiment.

The method starts at step S200. At step S210, a receiver accesses a stream. At step S220, the receiver decodes a central block without spatial prediction, i.e. without reference to another block. In a first embodiment the block is a view. In a variant, the block is a micro-image. A central block is a block located in a central region of the current plenoptic image. As an example, the central block is located at the center of the current plenoptic image to be decoded. Block size may be either read from metadata, or determined from the content. Block size may also be received in the stream, if not deducible from another information available at decoder side (e.g. camera device model). The central block may be decoded in intra mode without spatial prediction. As an example, the central block is decoded in IPCM mode (IPCM stands for Intra Pulse Code Modulation), the pixel values of the block are decoded directly without prediction, transformation or inverse quantization which are bypassed. In a variant, the central block is decoded with prediction from a constant block, e.g. for example from a block whose pixels are all equal to 128. The central block is thus obtained by adding the constant block to a residual block decoded from the stream. Decoding the residual block usually comprises entropy decoding, inverse quantization and transformation. In another variant, the central block is temporally predicted from a co-located block of a decoded plenoptic image, i.e. a plenoptic image already decoded for prediction and stored in a DPB. The central block is thus obtained by adding the co-located block to decoded residual block. At step S230, the receiver predictively decodes the remaining blocks from the center of the current plenoptic image up to the borders of the current plenoptic image with interleaved unidirectional and bi-directional predictions. In a variant, the receiver predictively decodes the blocks immediately surrounding the central block by spatially interleaving spatial unidirectional prediction and spatial bi-directional prediction. The method ends at step S240.

Figure 11:
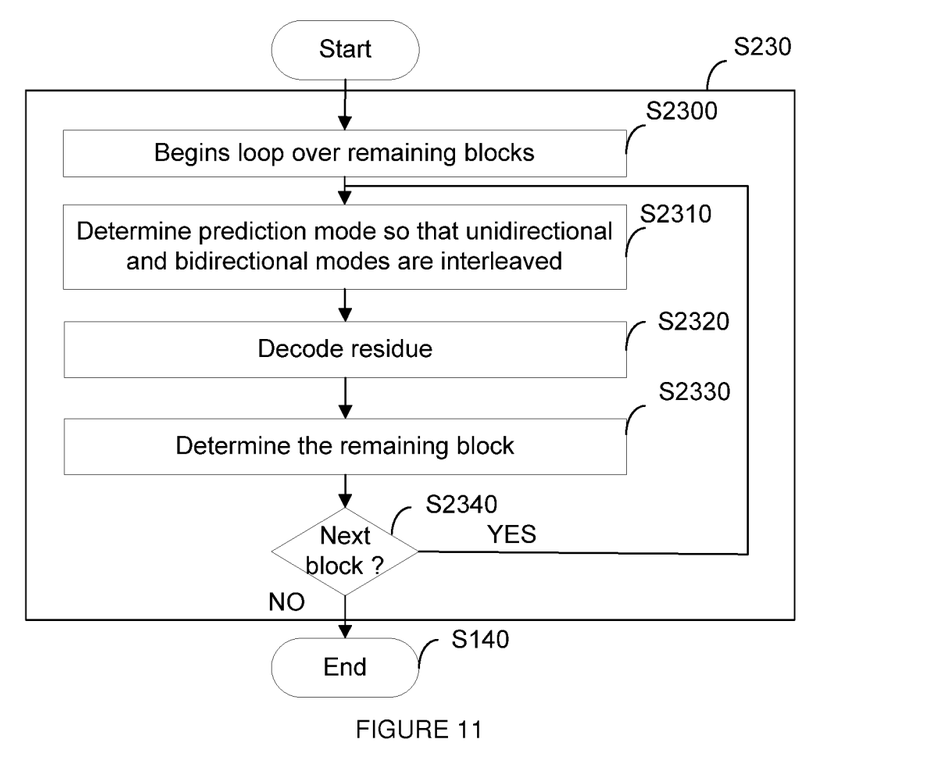
FIG. 11 represents a detail of FIG. 10.

Step S230 is further detailed on FIG. 11.

At step S2300, the methods begins to loop over the remaining blocks, i.e. the blocks different from the central block already decoded at step S220. At step S2310, a prediction mode between spatial unidirectional and spatial bidirectional is determined for the block to be decoded. The prediction mode is determined so that spatial unidirectional and spatial bi-directional predictions are interleaved. Prediction modes and coding order are either known at decoder side as default parameters, e.g. defined by a standard, or are explicitly received in the stream, e.g. decoded from the stream.

Let's denote $P_k$ and $B_k$ respectively the sets of blocks to be decoded during first and second sub-steps of step k, and $S_k = \{I_0\} \cup \{\cup_{l \leq k}(P_l \cup B_l)\}$ the set of all blocks decoded up to step k. $P_0$ and $B_0$ are empty sets.

The blocks to be decoded during a step k, k≥1, are the following:

The following blocks $P_k$ for which an horizontal or a vertical neighbor has just been decoded during step (k−1) are decoded in a first sub-step (sub-sets 1 a, 2a or 3a on FIGS. 6A to 6C) using unidirectional prediction (i.e. horizontal and vertical prediction):

$$P_k = \left\{ \begin{array}{c} C[i, j] \notin S_{k-1}: \\ \exists C[y, x] \in S_{k-1}, ((y = i \pm 1) \text{ and } (x = j)) \text{ or } \\ ((y = i) \text{ and } (x = j \pm 1)) \end{array} \right\} \quad (1)$$

The following blocks $B_k$ located at the corners of the rectangle started at previous sub-step are decoded in a second sub-step ((sub-sets 1b, 2b or 3b on FIGS. 6A to 6C) using bi-directional prediction:

$$B_k = \left\{ \begin{array}{c} C[i, j] \notin S_{k-1}: \\ \exists C[y, x] \in P_k, (y = i \pm 1) \text{ and } (x = j \pm 1) \end{array} \right\} \quad (2)$$

The definition of $P_1$ is different depending on the parity of n. If n is odd, the definition of $P_1$ complies with the generic one:

$$P_1^{odd} = \left\{ \begin{array}{c} C[i, j] \notin S_0: \\ \exists C[y, x] \in S_0, ((y = i \pm 1) \text{ and } (x = j)) \text{ or } \\ ((y = i) \text{ and } (x = j \pm 1)) \end{array} \right\} \quad (1a)$$

If n is even, the definition of $P_1$ only involves plus signs:

$$P_1^{even} = \left\{ \begin{array}{c} C[i, j] \notin S_0: \\ \exists C[y, x] \in S_0, ((y = i + 1) \text{ and } (x = j)) \text{ or } \\ ((y = i) \text{ and } (x = j + 1)) \end{array} \right\}$$

Blocks $C[i,j] \in P_k$, $k \geq 1$, are predicted from the block $C[y,x] \in S_{k-1}$ that verifies:

$$\begin{cases} (y = i) \text{ and } (x = j \pm 1) \text{ or} \\ ((y = i \pm 1) \text{ and } (x = j)) \end{cases}$$

Blocks $C[i,j] \in B_k$, $k \geq 1$, are predicted from the blocks $C[y,x] \in P_k$ that verify:

$$(y=i\pm 1) \text{ and } (x=j\pm 1)$$

At step S2320, residues ε, i.e. a residual block, are decoded from the stream. Decoding the residual block usually comprises entropy decoding, inverse quantization, transforming (e.g. using an inverse DCT). It will be appreciated, however, that the present principles are not restricted to this specific decoding method. At step S2330, the residual block is added to the reference R (pixel by pixel) to form the block C to be decoded. $C[i,j]=\varepsilon[i,j]+R[i,j]$. In case of bi-directional prediction R may be an average of 2 blocks. At step S2340, the transmitter checks whether more remaining blocks to be decoded exists. If yes, the control returns to step S2310. Otherwise, the method ends at S240.

The variants of step S1320 that take into account disparity and/or vignetting effect also apply to the decoder when adding the reference block to the residual block (step S2330) to determine the remaining blocks.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, block phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a block phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a 4D light field image divided into blocks comprising:

encoding a first block located in a geometrically central region of the 4D light field image compared to other blocks of the 4D light field image without spatial prediction with a reference block in said 4D light field image; and predictively encoding blocks immediately surrounding said first block by spatially interleaving spatial unidirectional prediction and spatial bi-directional prediction with a reference block in said 4D light field image, wherein the reference block is either the first block itself or a block in said 4D light field image that has been encoded with the first block as a reference block, and wherein an even number of blocks is comprised in said 4D light field image, and predictively encoding blocks immediately surrounding the first block by spatially interleaving spatial unidirectional prediction and spatial bi-directional prediction comprises encoding one immediately surrounding block neighboring vertically the first block and one immediately surrounding block neighboring horizontally the first block by spatial unidirectional prediction;

encoding the immediately surrounding block neighboring the two immediately surrounding blocks previously encoded by bi-directional prediction; encoding, by uni-directional prediction, the immediately surrounding blocks neighboring vertically or horizontally one of the previously encoded blocks and encoding the remaining immediately surrounding block by bi-directional prediction.

2. The method according to claim 1, further comprising predictively encoding remaining blocks by processing blocks from the blocks immediately surrounding the geometric center of the 4D light field image up to the borders of the 4D light field image by spatially interleaving spatial unidirectional and spatial bi-directional predictions, wherein the spatial interleaving comprises:

$P_k$ and $B_k$ respectively denote the sets of blocks to be encoded during first and second sub-steps of step k, and $S_k = \{I_0\} \cup \{U_{l \leq k}(P_l \cup B_l)\}$ the set of all blocks encoded up to step k, and $P_0$ and $B_0$ are empty sets, and the blocks to be encoded during a step k, k≥1, are:

$P_k$ for which a horizontal neighbor or a vertical neighbor has just been encoded during step (k−1) are encoded in a first sub-step using unidirectional prediction horizontally and vertically:

$$P_k = \left\{ \begin{array}{l} C[i, j] \notin S_{k-1}: \\ \exists\ C[y, x] \in S_{k-1}, ((y = i \pm 1)\ \text{and} \\ (x = j))\ \text{or}\ ((y = i)\ \text{and}\ (x = j \pm 1)) \end{array} \right\}$$

and $B_k$ located at the corners of the rectangle started at previous sub-step are encoded in a second sub-step using bi-directional prediction:

$$B_k = \left\{ \begin{array}{l} C[i, j] \notin S_{k-1}: \\ \exists\ C[y, x] \in P_k, (y = i \pm 1)\ \text{and}\ (x = j \pm 1) \end{array} \right\}$$

wherein the definition of $P_1$ differs depending on a parity of n such that if n is odd:

$$P_1^{odd} = \left\{ \begin{array}{l} C[i, j] \notin S_0: \\ \exists\ C[y, x] \in S_0, ((y = i \pm 1)\ \text{and} \\ (x = j))\ \text{or}\ ((y = i)\ \text{and}\ (x = j \pm 1)) \end{array} \right\}$$

and, if n is even:

$$P_1^{even} = \left\{ \begin{array}{l} C[i, j] \notin S_0: \\ \exists\ C[y, x] \in S_0, ((y = i + 1)\ \text{and} \\ (x = j))\ \text{or}\ ((y = i)\ \text{and}\ (x = j + 1)) \end{array} \right\}.$$

3. The method according to claim 1, wherein either all of the blocks are a micro-image type or all of the blocks are a view type.

4. The method according to claim 1, wherein the first block is intra coded using information contained only in the first block.

5. The method according to claim 1, wherein the first block is temporally predicted from a spatially co-located block in a reconstructed 4D light field image.

6. The method according to claim 1, wherein the blocks being views images, and during prediction of a block by a reference block, said reference block is weighted by a weight derived from vignetting information.

7. A method for decoding a 4D light field image divided into blocks comprising:

decoding a first block in a geometrically central region of the 4D light field image compared to other blocks of the 4D light field image without spatial prediction with a reference block in the 4D light field image; and predictively decoding blocks immediately surrounding said block by spatially interleaving spatial unidirectional prediction and spatial bi-directional prediction with a reference block in said 4D light field image, wherein the reference block is either the first block itself or a block in said 4D light field image that has been encoded with the first block as a reference block, and wherein said 4D light field image comprises an even number of blocks, and predictively decoding blocks immediately surrounding the first block by spatially interleaving spatial unidirectional prediction and spatial bi-directional prediction comprises decoding one immediately surrounding block neighboring vertically the first block and one immediately surrounding block neighboring horizontally the first block by spatial unidirectional prediction; decoding the immediately surrounding block neighboring the two immediately surrounding blocks previously decoded by bi-directional prediction; decoding, by uni-directional prediction, the immediately surrounding blocks neighboring vertically or horizontally one of the previously decoded blocks and decoding the remaining immediately surrounding block by bi-directional prediction.

8. The method according to claim 7, further comprising predictively decoding remaining blocks by processing blocks from the blocks immediately surrounding the geometric center of the 4D light field image up to the borders of the 4D light field image by spatially interleaving spatial unidirectional and spatial bi-directional predictions wherein spatial interleaving comprises:

$P_k$ and $B_k$ respectively denote the sets of blocks to be decoded during first and second sub-steps of step k, and $S_k = \{I_0\} \cup \{U_{l \leq k}(P_l \cup B_l)\}$ the set of all blocks decoded up to step k, and $P_0$ and $B_0$ are empty sets, and the blocks to be decoded during a step k, k≥1, are:

$P_k$ for which a horizontal neighbor or a vertical neighbor has just been decoded during step (k−1) are decoded in a first sub-step using unidirectional prediction horizontally and vertically:

$$P_k = \left\{ \begin{array}{l} C[i, j] \notin S_{k-1}: \\ \exists\ C[y, x] \in S_{k-1}, ((y = i \pm 1)\ \text{and} \\ (x = j))\ \text{or}\ ((y = i)\ \text{and}\ (x = j \pm 1)) \end{array} \right\}$$

and $B_k$ located at the corners of the rectangle started at previous sub-step are decoded in a second sub-step using bi-directional prediction:

$$B_k = \left\{ \begin{array}{c} C[i, j] \notin S_{k-1}: \\ \exists\ C[y, x] \in P_k, (y = i \pm 1) \text{ and } (x = j \pm 1) \end{array} \right\}$$

wherein the definition of $P_1$ differs depending on a parity of n such that if n is odd:

$$P_1^{odd} = \left\{ \begin{array}{c} C[i, j] \notin S_0: \\ \exists\ C[y, x] \in S_0, ((y = i \pm 1) \text{ and } \\ (x = j)) \text{ or } ((y = i) \text{ and } (x = j \pm 1)) \end{array} \right\}$$

and, if n is even:

$$P_1^{even} = \left\{ \begin{array}{c} C[i, j] \notin S_0: \\ \exists\ C[y, x] \in S_0, ((y = i + 1) \text{ and } \\ (x = j)) \text{ or } ((y = i) \text{ and } (x = j + 1)) \end{array} \right\}.$$

9. The method according to claim 7, wherein either all of the blocks are a micro-image type or all of the blocks are a view type.

10. The method according to claim 7, wherein the first block is intra coded using information contained only in the first block.

11. The method according to claim 7, wherein the first block is temporally predicted from a spatially co-located block in a reconstructed 4D light field image.

12. The method according to claim 7, wherein the blocks being views images, and during prediction of a block by a reference block, said reference block is weighted by a weight derived from vignetting information.

13. A device for encoding a 4D light field image divided into blocks, comprising a processor and at least one memory unit, the processor being configured to:
encode a first block located in a geometrically central region of the 4D light field image compared to other blocks in the 4D light field image without spatial prediction with a reference block in said 4D light field image; and
predictively encode blocks immediately surrounding said first block by spatially interleaving spatial unidirectional prediction and spatial bi-directional prediction with a reference block in said 4D light field image, wherein the reference block is either the central block itself or a block in said 4D light field image that has been encoded with the first block as a reference block, and wherein
an even number of blocks is comprised in said 4D light field image, and
predictively encoding blocks immediately surrounding the first block by spatially interleaving spatial unidirectional prediction and spatial bi-directional prediction comprises encoding one immediately surrounding block neighboring vertically the first block and one immediately surrounding block neighboring horizontally the first block by spatial unidirectional prediction; encoding the immediately surrounding block neighboring the two immediately surrounding blocks previously encoded by bi-directional prediction; encoding, by unidirectional prediction, the immediately surrounding blocks neighboring vertically or horizontally one of the previously encoded blocks and encoding the remaining immediately surrounding block by bi-directional prediction.

14. A device for decoding a 4D light field image divided into blocks, comprising a processor and at least one memory unit, the processor being configured to:
decode a first block in a geometrically central region of the 4D light field image compared to other blocks in the 4D light field image without spatial prediction with a reference block in said 4D light field image; and
predictively decode blocks immediately surrounding said first block by spatially interleaving spatial unidirectional prediction and spatial bi-directional prediction with a reference block in said 4D light field image, wherein the reference block is either the first block itself or a block in said 4D light field image that has been encoded with the first block as a reference block, and wherein
said 4D light field image comprises an even number of blocks, and
predictively decoding blocks immediately surrounding the first block by spatially interleaving spatial unidirectional prediction and spatial bi-directional prediction comprises decoding one immediately surrounding block neighboring vertically the first block and one immediately surrounding block neighboring horizontally the first block by spatial unidirectional prediction; decoding the immediately surrounding block neighboring the two immediately surrounding blocks previously decoded by bi-directional prediction; decoding, by unidirectional prediction, the immediately surrounding blocks neighboring vertically or horizontally one of the previously decoded blocks and decoding the remaining immediately surrounding block by bi-directional prediction.

15. The method of claim 1, wherein in the case of an odd number of blocks is comprised in said 4D light field image, predictively encoding blocks immediately surrounding the first block by spatially interleaving spatial unidirectional prediction and spatial bi-directional prediction comprises encoding by spatial unidirectional prediction the immediately surrounding blocks neighboring vertically or horizontally the first block and encoding by spatial bi-directional prediction the other immediately surrounding blocks diagonally neighboring the first block.

16. The method of claim 7, wherein in the case of said 4D light field image comprising an odd number of blocks, predictively decoding blocks immediately surrounding the first block by spatially interleaving spatial unidirectional prediction and spatial bi-directional prediction comprises decoding by spatial unidirectional prediction the immediately surrounding blocks neighboring vertically or horizontally the first block and decoding by spatial bi-directional prediction the other immediately surrounding blocks diagonally neighboring the first block.

17. The device of claim 13, wherein the processor is further configured for, in the case of an odd number of blocks is comprised in said 4D light field image, predictively encoding blocks immediately surrounding the first block by spatially interleaving spatial unidirectional prediction and spatial bi-directional prediction comprises encoding by spatial unidirectional prediction the immediately surrounding blocks neighboring vertically or horizontally the first block and encoding by spatial bi-directional prediction the other immediately surrounding blocks diagonally neighboring the first block.

18. The device of claim 14, wherein the processor is further configure for, in the case of said 4D light field image comprising an odd number of blocks, predictively decoding blocks immediately surrounding the first block by spatially interleaving spatial unidirectional prediction and spatial bi-directional prediction comprises decoding by spatial uni-directional prediction the immediately surrounding blocks neighboring vertically or horizontally the first block and decoding by spatial bi-directional prediction the other immediately surrounding blocks diagonally neighboring the first block.

* * * * *